May 15, 1962     D. B. SPENCER     3,034,164
BORING MACHINE
Filed July 7, 1958     11 Sheets-Sheet 1
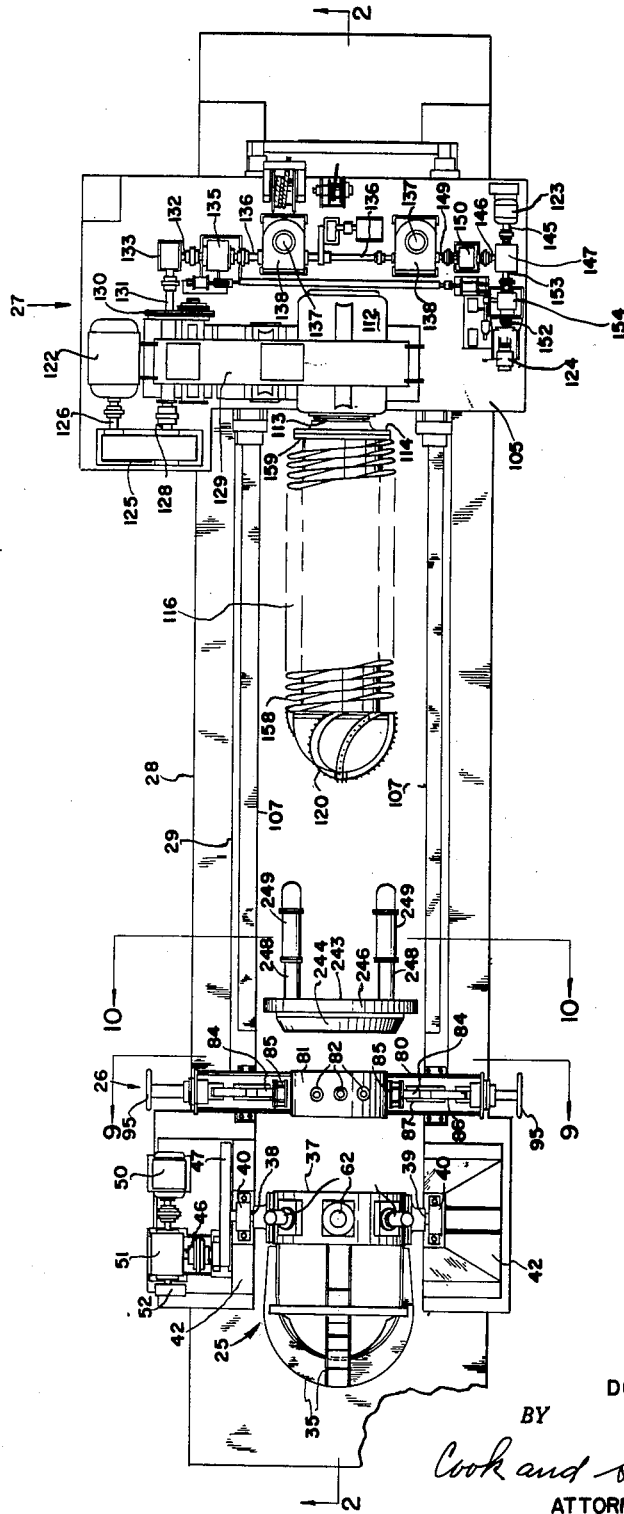
INVENTOR.
DONALD B. SPENCER
BY
Cook and Schermerhorn
ATTORNEYS May 15, 1962
D. B. SPENCER
3,034,164
BORING MACHINE
Filed July 7, 1958
11 Sheets-Sheet 2
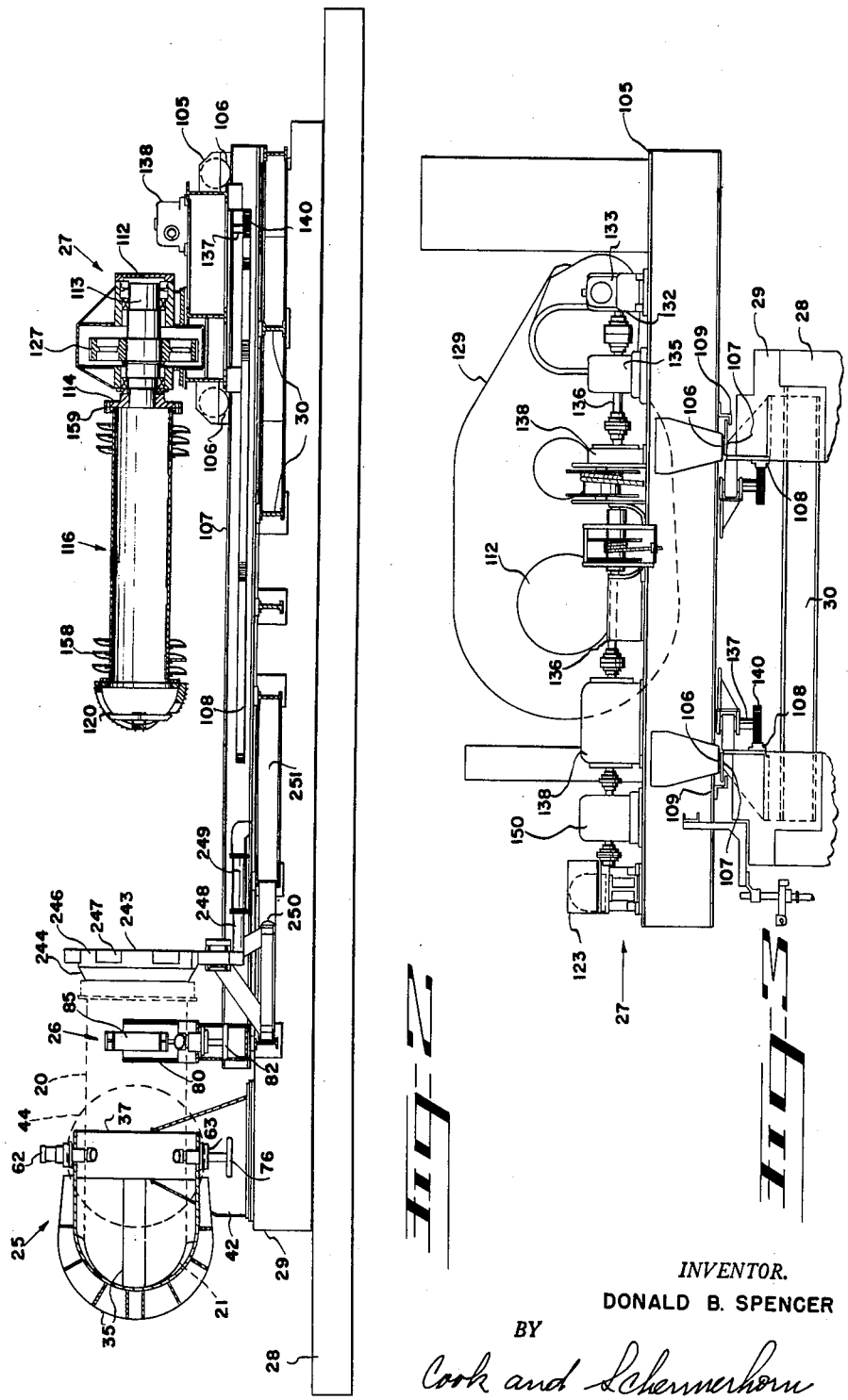
INVENTOR.
DONALD B. SPENCER
BY
Cook and Schernerhorn
ATTORNEYS

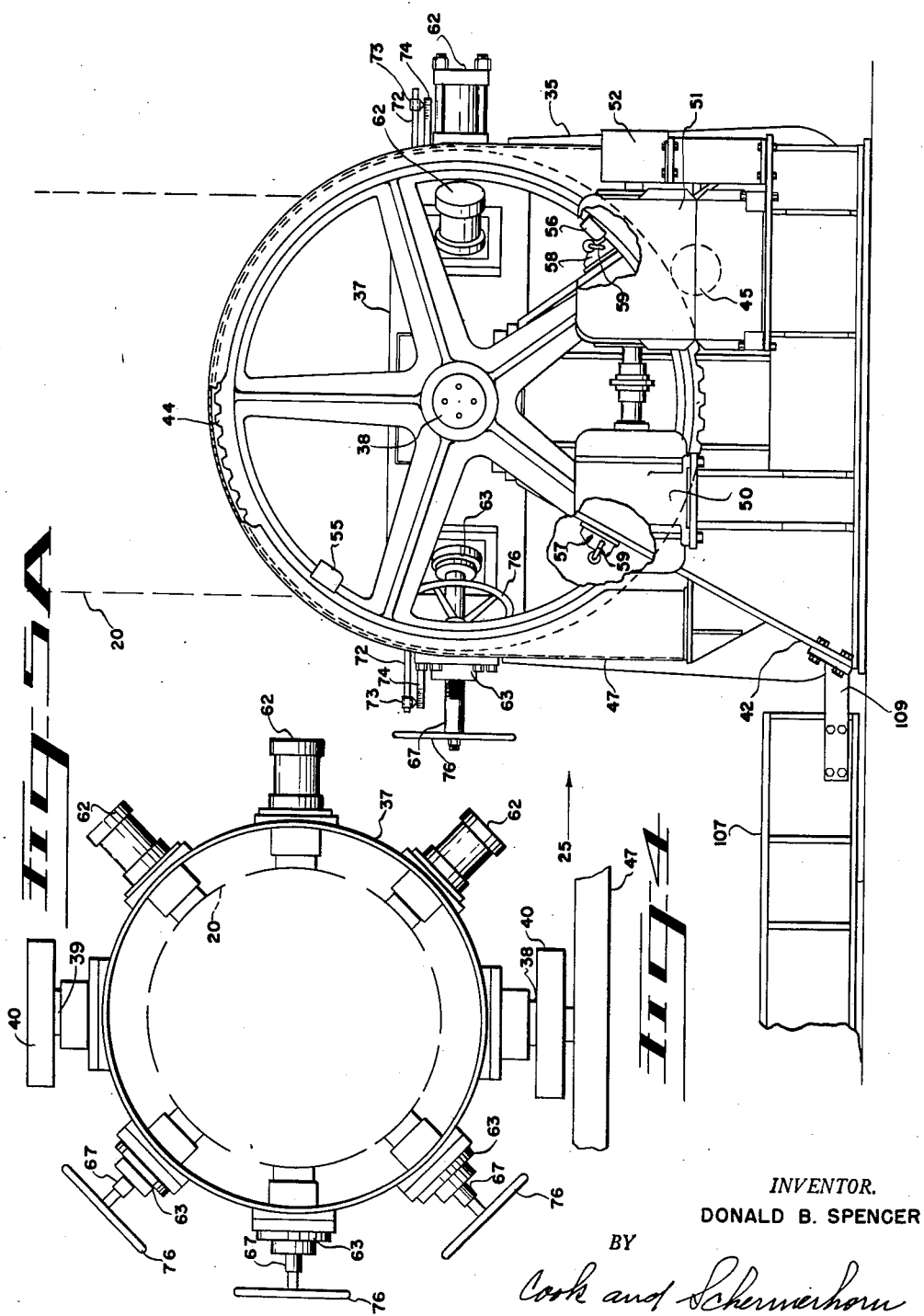

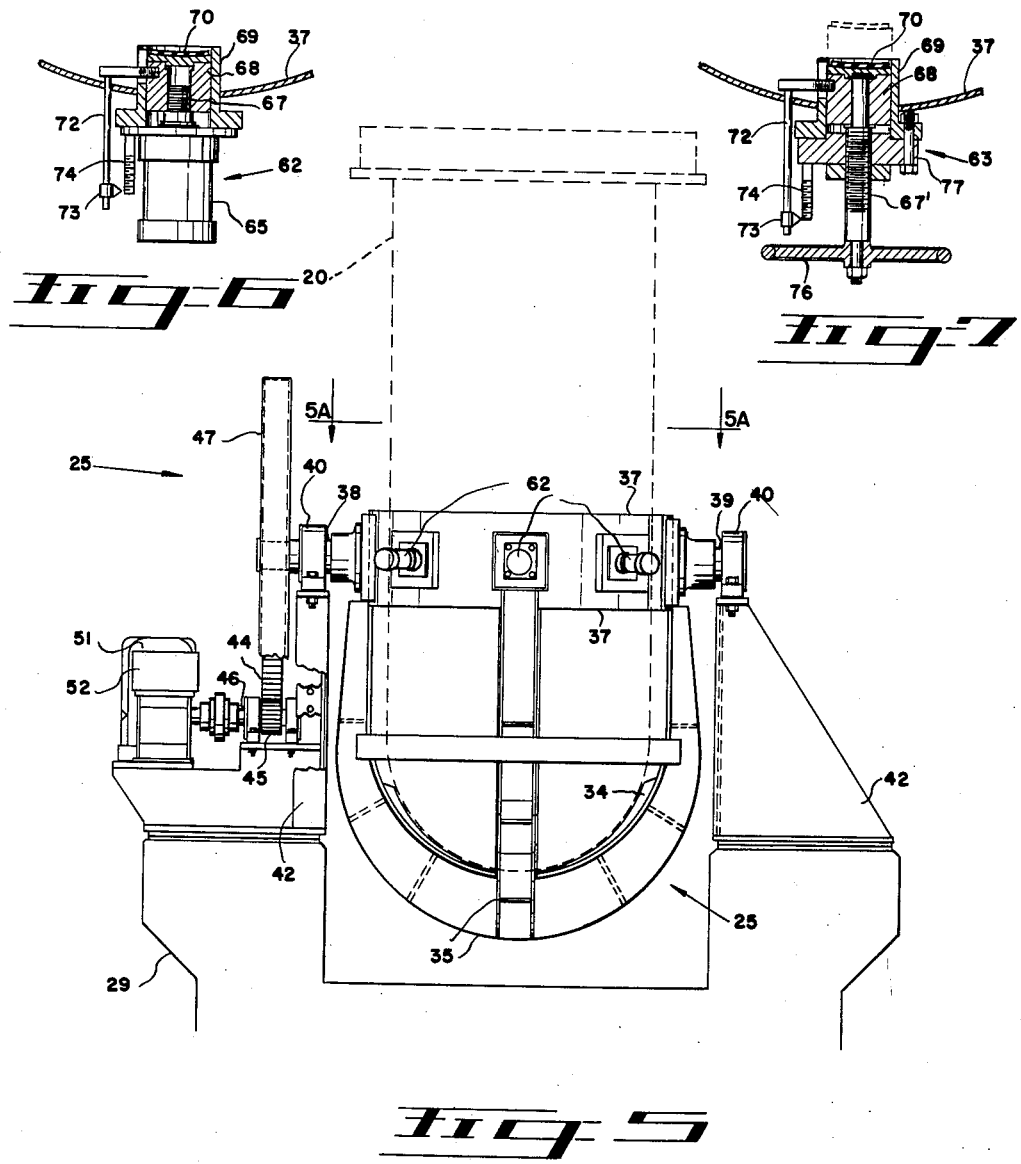

May 15, 1962 D. B. SPENCER 3,034,164
BORING MACHINE
Filed July 7, 1958 11 Sheets-Sheet 5
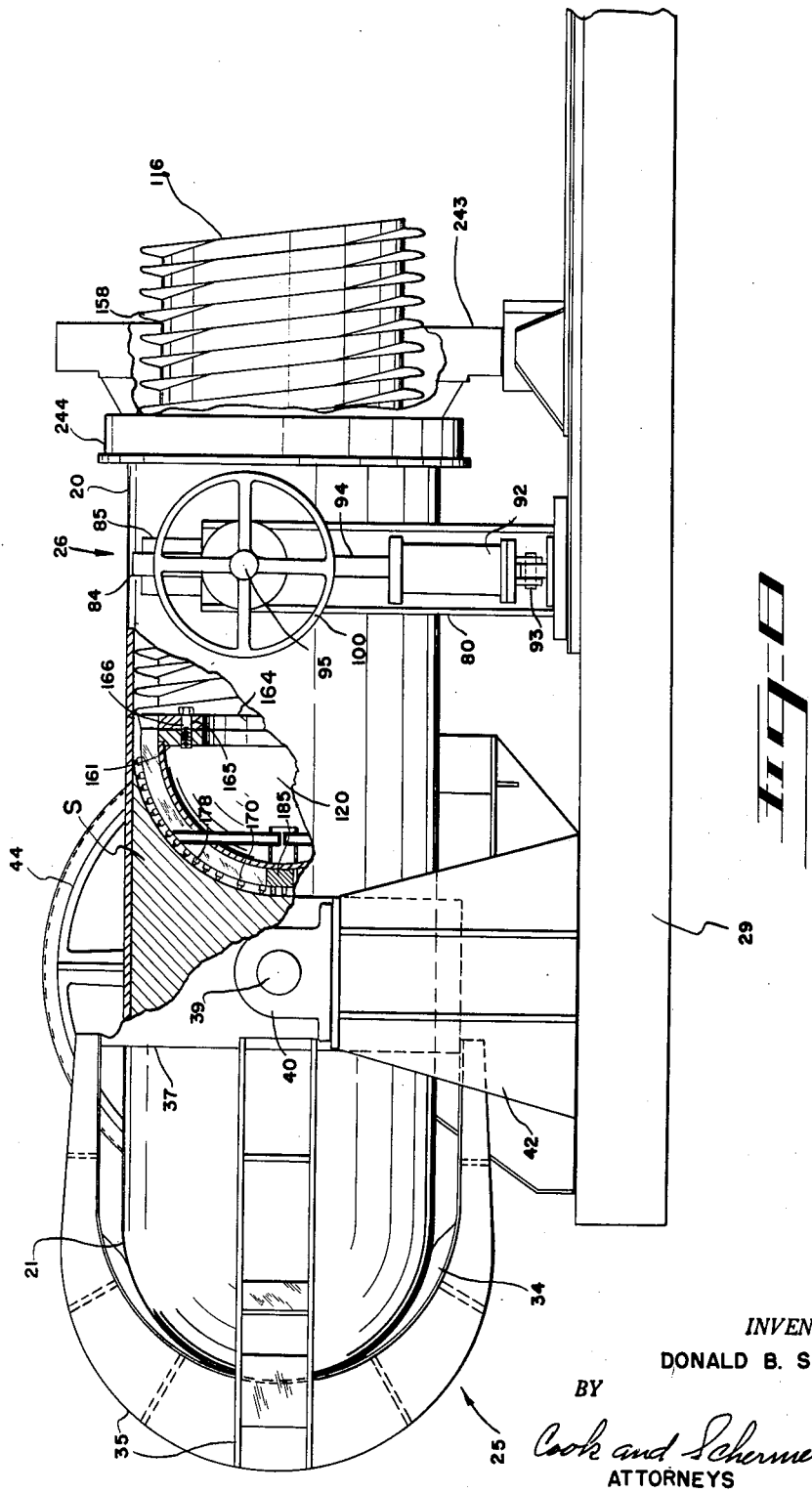
INVENTOR.
DONALD B. SPENCER
BY
Cook and Schermerhorn
ATTORNEYS May 15, 1962
D. B. SPENCER
3,034,164
BORING MACHINE
Filed July 7, 1958
11 Sheets-Sheet 6
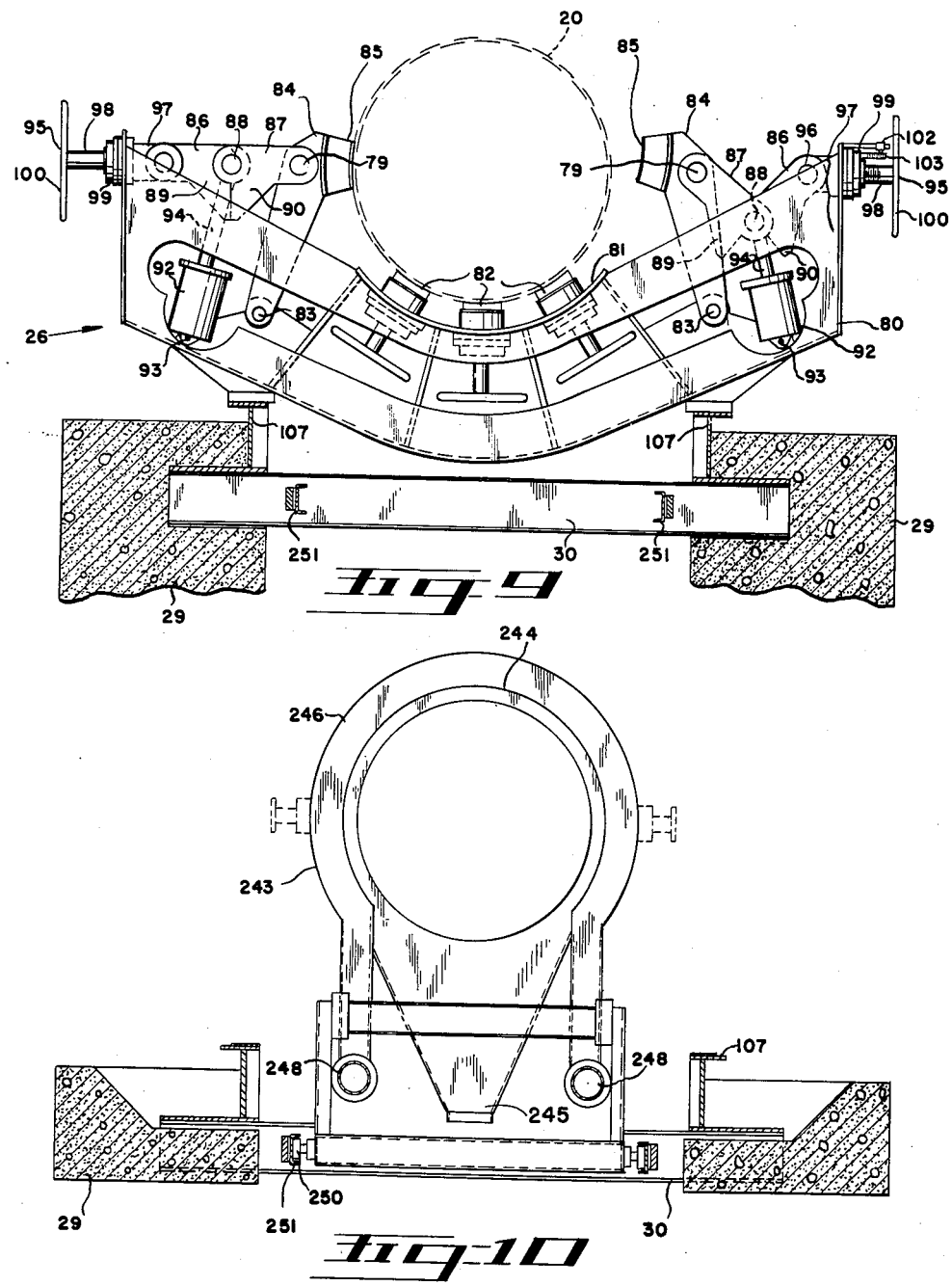
INVENTOR.
DONALD B. SPENCER
BY
Cook and Schermerhorn
ATTORNEYS

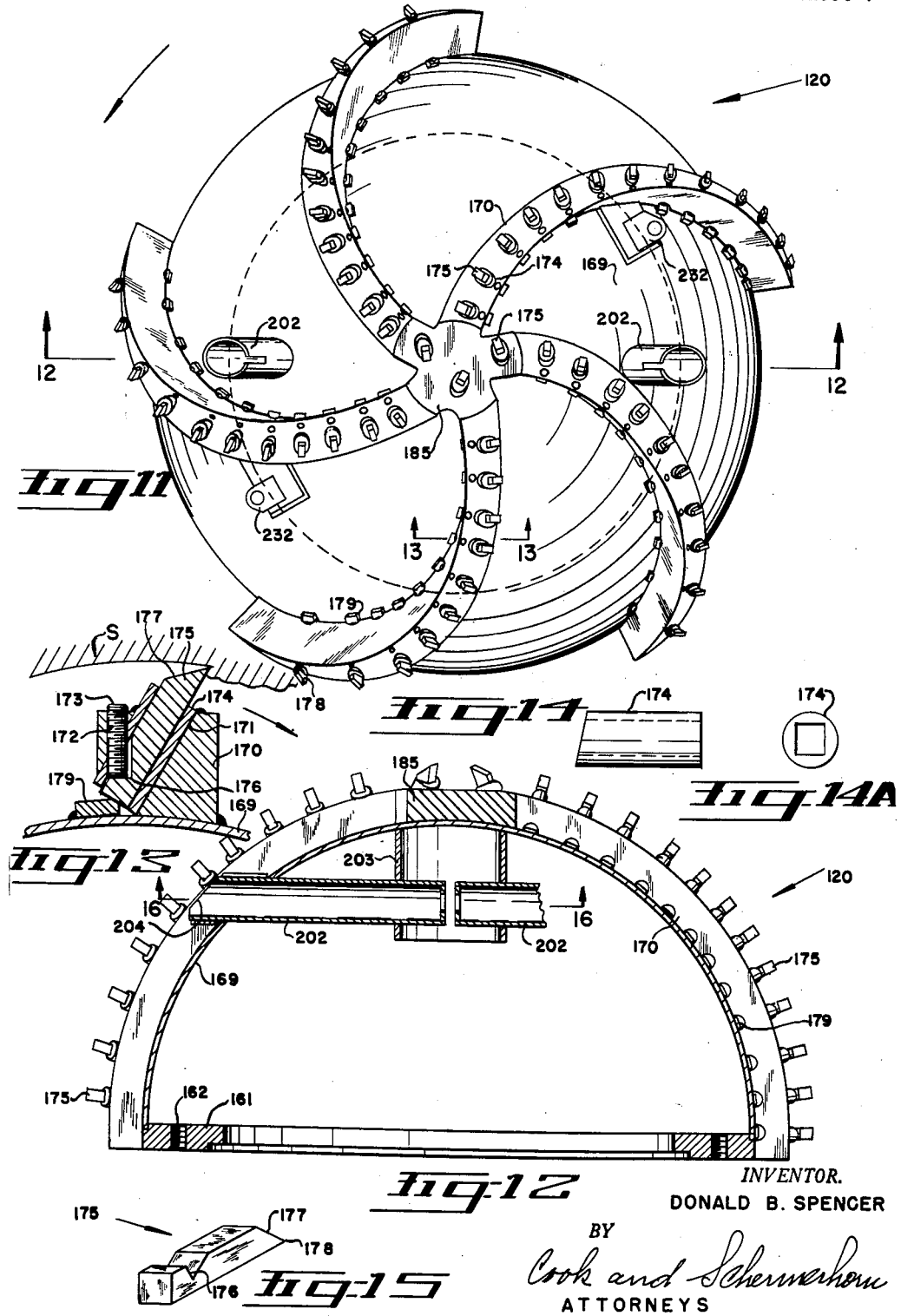

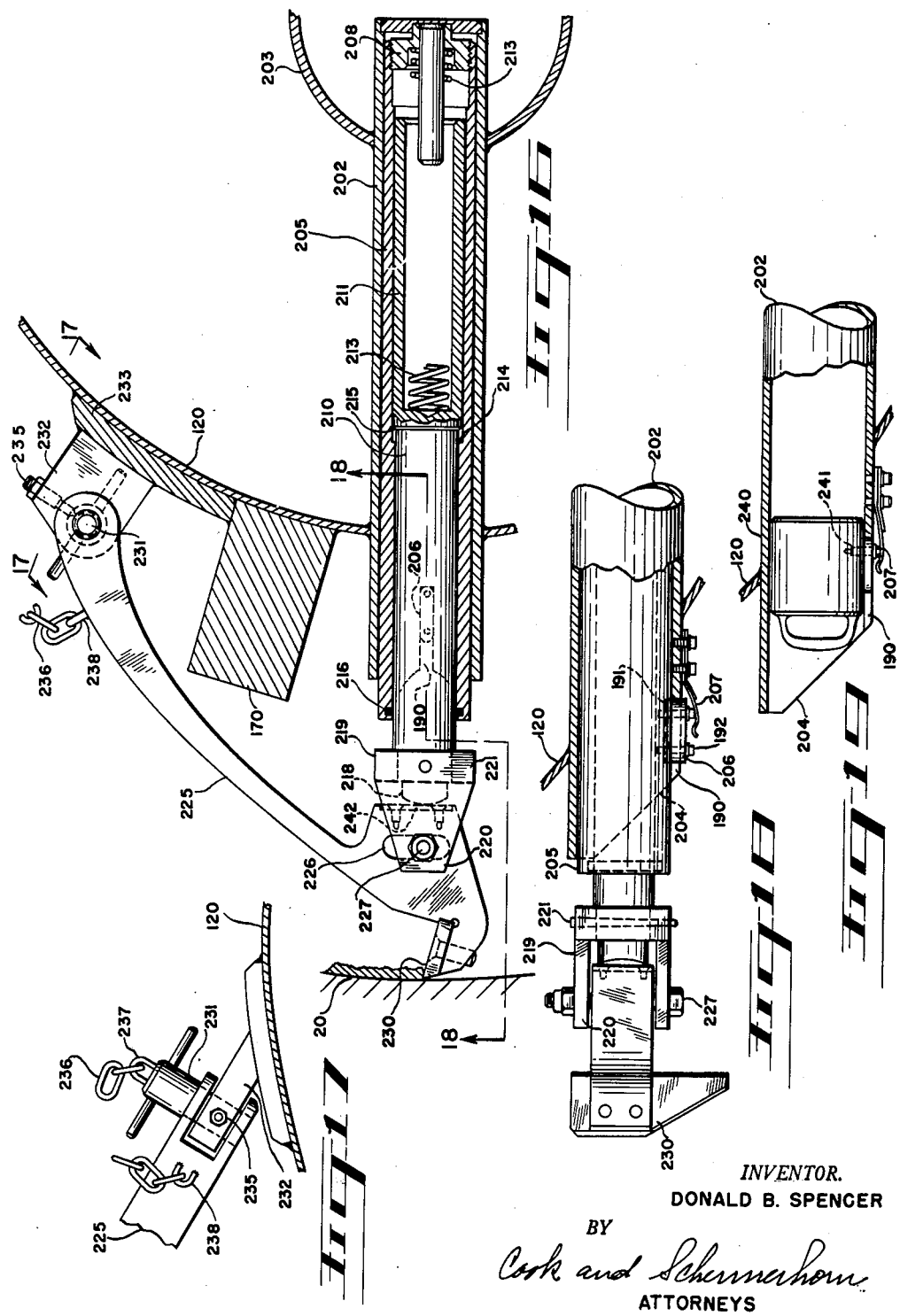

May 15, 1962  D. B. SPENCER  3,034,164
BORING MACHINE

Filed July 7, 1958 11 Sheets-Sheet 9

INVENTOR.
DONALD B. SPENCER
BY
Cook and Schermerhorn
ATTORNEYS

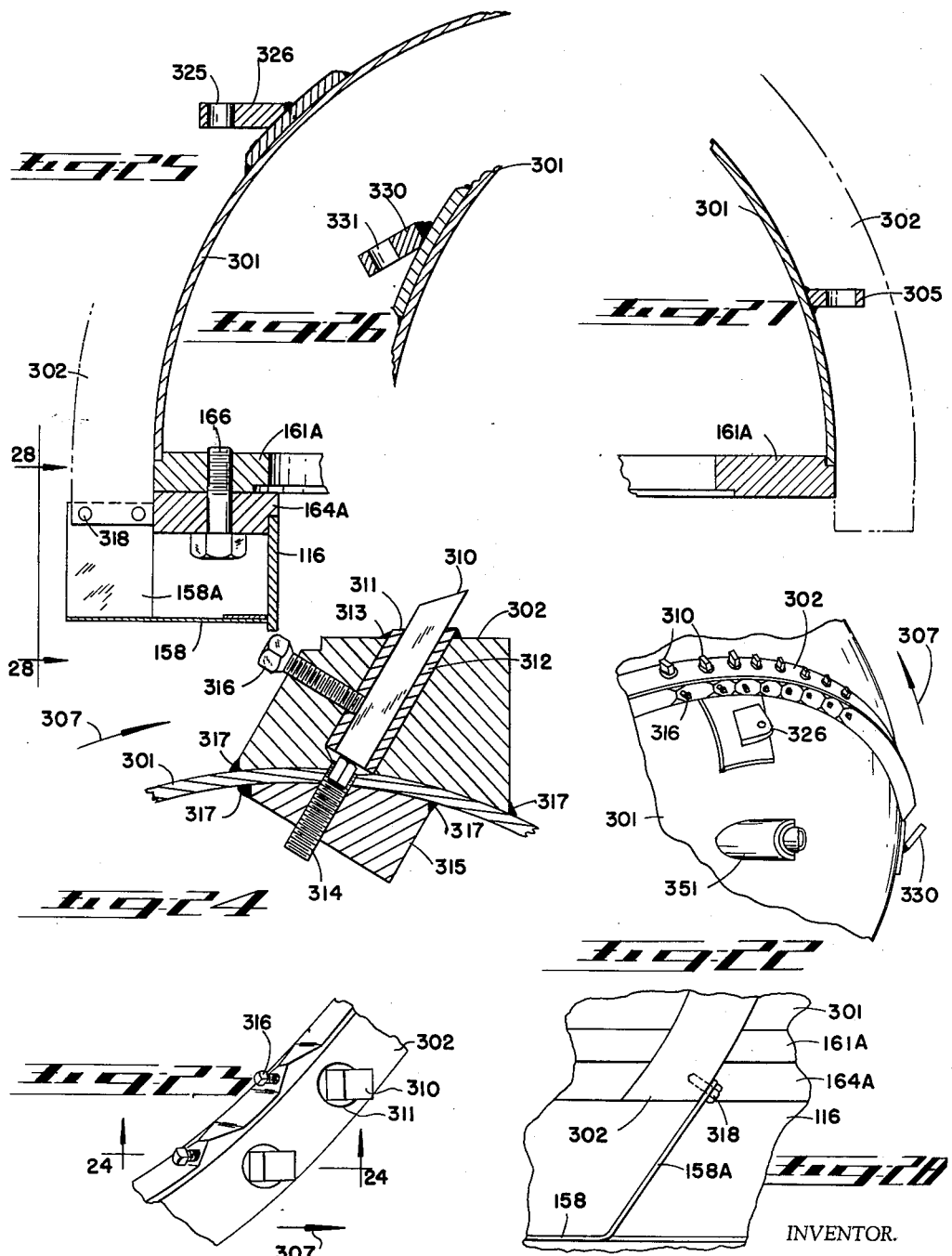

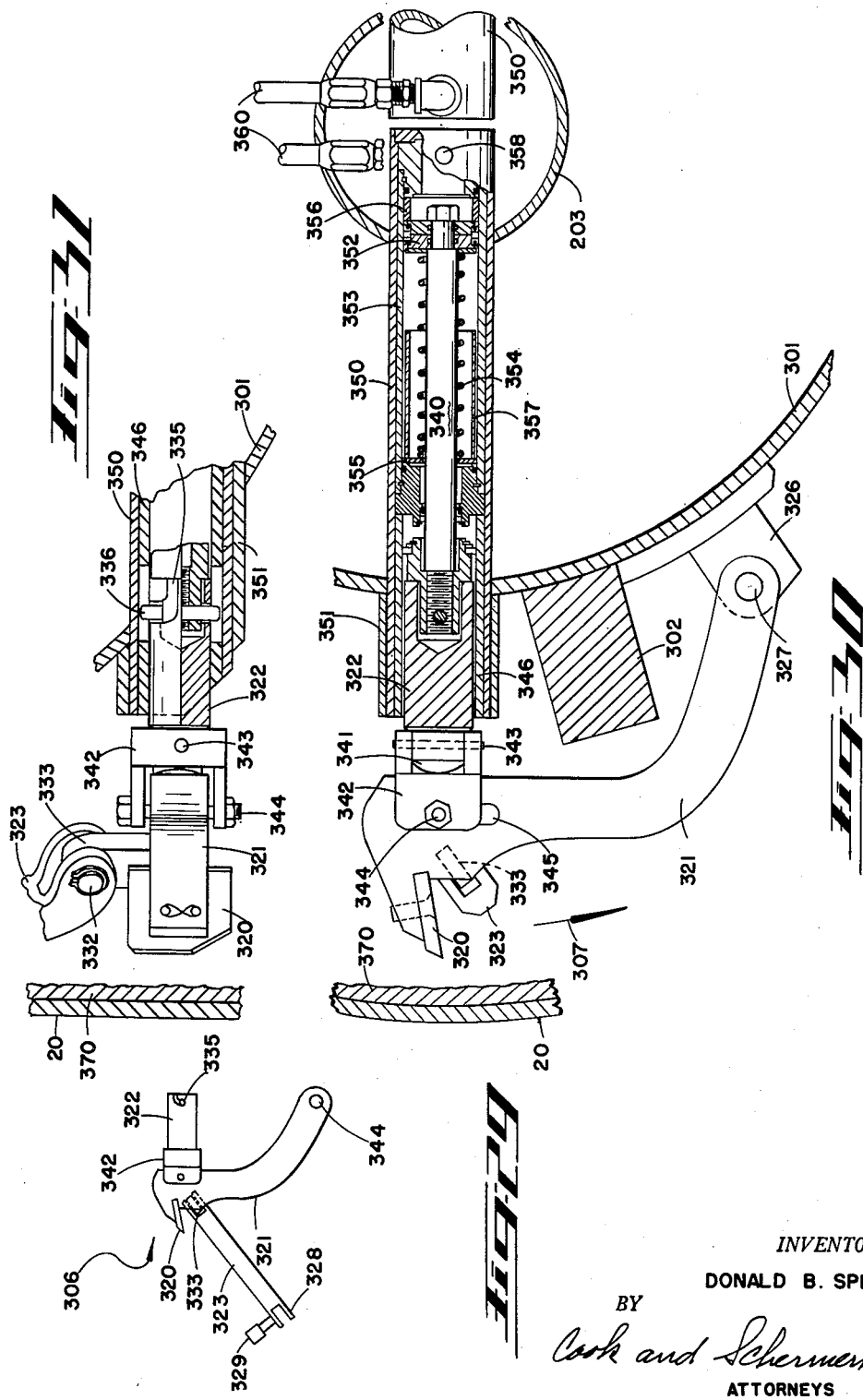

United States Patent Office 3,034,164
Patented May 15, 1962

3,034,164
BORING MACHINE
Donald B. Spencer, Portland, Oreg., assignor to Guy F. Atkinson Company, South San Francisco, Calif., a corporation of Nevada
Filed July 7, 1958, Ser. No. 746,732
13 Claims. (Cl. 15—104.1)

The present invention relates to a boring machine for cutting and removing material from a hard mass. Although the boring machine may be used for different purposes, it is described herein in connection with the removal of hard material from a container, such as the metal-containing residues produced when metals like titanium or zirconium are made in a reactor by reduction.

This application is a continuation-in-part of my copending application Serial No. 586,495, Boring Machine, filed May 22, 1956.

A primary object of the invention is to provide an improved boring machine for conveniently and efficiently breaking and removing hard material from a solid, stationary mass.

Another object is to provide a boring machine having improved boring tool carriage means operative to feed the tool into a mass and simultaneously rotate the tool.

Another object is to provide a boring machine having improved boring tool carriage means movable at different speeds in feed and retractive movements and having means for driving the boring tool at variable speeds for maximum efficiency in a boring operation.

Still further objects of the invention are to provide a boring machine having an improved boring tool for penetrating a solid mass in a container; to provide an improved cutter head on said boring tool having cutting means effectively to reduce a large, solid mass of material into small particles or fragments quickly and efficiently with minimum production of fines and dust; to provide a cutter head having a multiplicity of cutting bits arranged to cut in all radial directions within a hemispherical envelope symmetrical with the head with automatic centering action and no unbalanced side loading on the boring tool; to provide a cutter head capable of boring without interruption when large material break loose from the main mass; to provide a cutter head which will keep the maximum size of the product particles within a predetermined limit; to provide a cutter head with a multiplicity of tool bits so distributed and arranged on the head that the bits do equal work and remove equal volumes of material in unit time, to equalize the wear on the bits even though the lengths of the tool paths vary over a wide range in the different tool positions; to provide readily adjustable bit holders in the cutter head; to provide an improved cutter head having scraping means for efficiently cleaning the walls of the container; to provide fluid pressure actuated scrapers which are readily detachable from the cutter head; and to provide a boring tool having improved means for removing the cut material from the interior of the reactor.

The above objects are accomplished by an apparatus comprising, in general, holding means for a reactor, or other container, and a boring tool on a carriage having longitudinal movement relative to the reactor holding means. The reactor holding means comprises a tilting cradle and a stationary rest and clamp assembly which function to anchor the reactor in a rigid, centered position for boring. The boring tool carriage has feed and retract movement relative to the reactor holding means and has an elongated boring tool which advances into the reactor during a boring operation. Preferably, the boring tool has a hemispherically shaped cutter head provided with a large number of small cutting bits mounted on spiral bars on the head. Also, it is desirable to provide the head with detachable scraping means which function to remove the condensate from the exposed inner wall surface of the reactor before the boring operation. Retractible hopper means can be provided for directing cut particles from the reactor into suitable transporting or storage means.

The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claims, which will occur to persons skilled in the art, are included in the invention.

In the drawings:

FIGURE 1 is a top plan view of the present boring machine;

FIGURE 2 is a longitudinal sectional view of the machine taken on the line 2—2 of FIGURE 1;

FIGURE 3 is an end elevational view of the boring tool carriage;

FIGURE 4 is a fragmentary side elevational view, with parts broken away, of the tilting mechanism which supports the reactor and pivots it between loading and boring positions;

FIGURE 5 is an end elevational view of the tilting mechanism;

FIGURE 5a is a plan view taken on the line 5a—5a of FIGURE 5;

FIGURE 6 is a sectional view of one of a plurality of power-operated clamps engageable with the reactor to assist in holding the reactor firmly in place in an aligned position;

FIGURE 7 is a sectional view of one of a plurality of hand-operated clamps which are operated in conjunction with the power-operated clamps to hold the reactor in place;

FIGURE 8 is a fragmentary side elevational view with parts broken away, showing the boring tool in a boring position in a reactor;

FIGURE 9 is a sectional view taken on the line 9—9 of FIGURE 1, showing in particular the stationary rest and clamp assembly for holding the open end of the reactor in boring position;

FIGURE 10 is a sectional view taken on the line 10—10 of FIGURE 1, showing the hopper means for receiving the cut particles from the reactor;

FIGURE 11 is an end view of the boring tool cutter head;

FIGURE 12 is a central sectional view of the cutter head taken on the line 12—12 of FIGURE 11 and with two opposed spiral bars being shown in developed form;

FIGURE 13 is a cross sectional view of a spiral bar on the cutter head for holding the cutting bits, taken on the line 13—13 of FIGURE 11;

FIGURE 14 is a side elevational view of a bit holder;

FIGURE 14a is an end elevational view of a bit holder;

FIGURE 15 is a perspective view of a cutting bit;

FIGURE 16 is an enlarged fragmentary sectional view of the cutting head taken on the line 16—16 of FIGURE 12 showing scraping means attached thereto;

FIGURE 17 is a fragmentary view taken on the line 17—17 of FIGURE 16;

FIGURE 18 is a sectional view taken on the line 18—18 of FIGURE 16;

FIGURE 19 is a fragmentary elevational view partly broken away showing plug means in the head in lieu of the scraper means;

FIGURE 22 is a fragmentary end elevation view of the right side of the cutter head shown in FIGURE 20 with the scraper removed;

FIGURE 23 is a fragmentary view of one of the cutter ribs shown in FIGURES 20-22, looking at the cutter head in end elevation;

FIGURE 24 is a cross sectional view of the cutter rib taken on the line 24—24 of FIGURE 23;

FIGURE 25 is a fragmentary longitudinal sectional view of the cutter head of FIGURE 20, showing a scraper arm anchor bracket with the scraper removed;

FIGURE 26 is a similar view showing a scraper stiff link anchor bracket;

FIGURE 27 is a similar view showing the lift lug on the cutter head;

FIGURE 28 is a fragmentary side elevation view on the line 28—28 of FIGURE 25, showing the connection of the boring tube fin with one of the cutter ribs on the cutter head;

FIGURE 29 is a general view of a removable scraper assembly shown in FIGURES 20 and 21;

FIGURE 30 is a cross sectional view through the cutter head of FIGURE 20, showing an air cylinder and scraper arm; and FIGURE 31 is a fragmentary longitudinal sectional view through the cutter head showing a portion of the scraper mechanism at right angle to the view in FIGURE 30.

Figure 20:
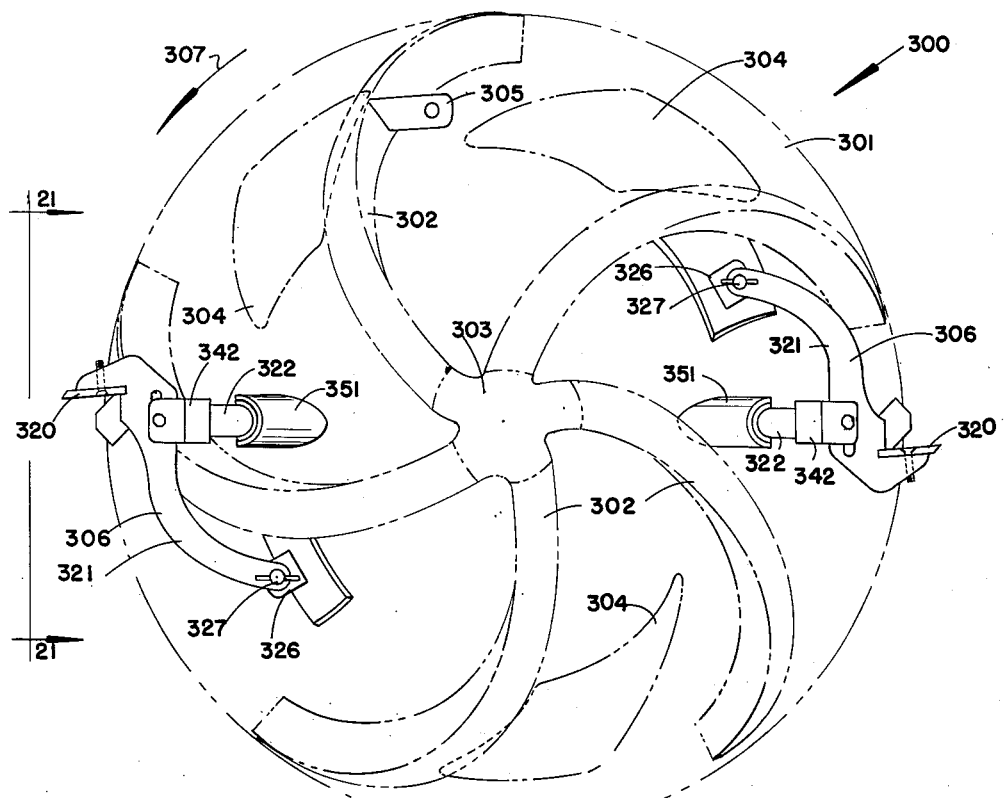
FIGURE 20 is an end elevation view of a modified cutter head showing the scrapers attached.
Figure 21:
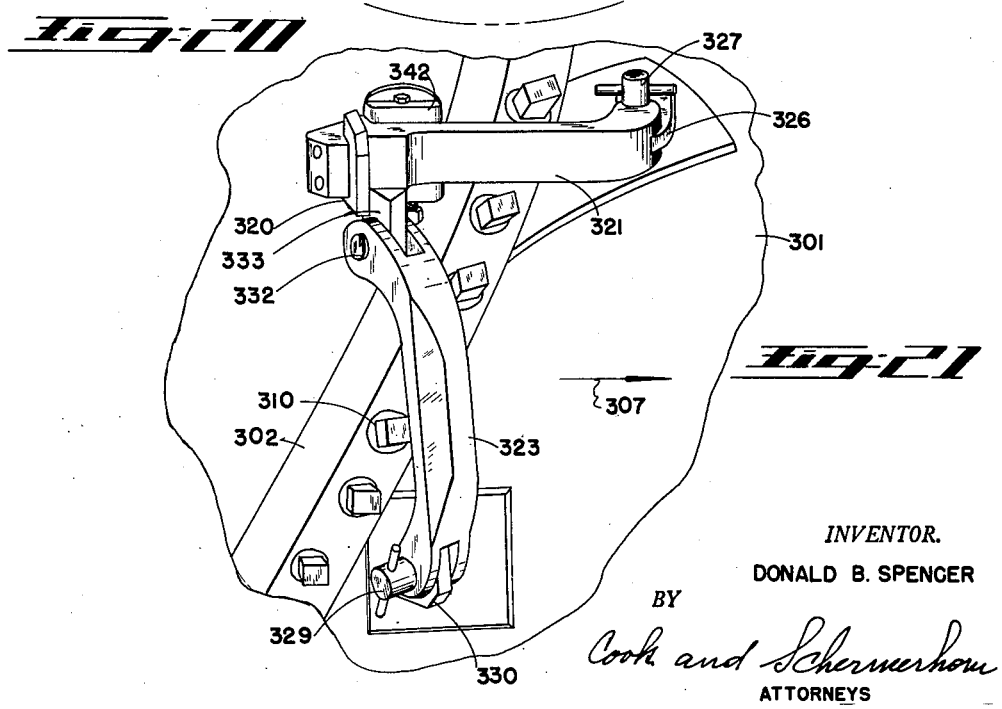
FIGURE 21 is a fragmentary side elevation view taken on the line 21—21 in FIGURE 20, showing one of the scrapers.

Referring specifically to the drawings, there is shown in FIGURES 2, 5 and 8 a reactor 20 such as is used in the reduction and refinement of metals like titanium or zirconium from metal-containing compounds or ores. The reactor 20, when it emerges from a reduction process, contains a hard mass S, FIGURE 8, consisting of titanium or other metal sponge in a matrix of solid salt form, and the next step in the process requires the removal of said solidified mixture from the reactor, this latter step being accomplished by the present invention. The reactor 20 may be an elongated tubular container, or pot, open at its top end and having a rounded closed bottom portion 21. The reactor is handled by an overhead crane assembly or such mechanism, not shown, connected to the reactor by a suitable bail. Means are provided on the reactor for establishing a lifting connection with the bail, such as lugs secured to the reactor, or a lifting ring secured to the reactor and having lugs thereon.

The invention comprises, in general, three principal parts, i.e., a reactor holder and tilting mechanism 25, a stationary rest and clamp assembly 26, and a boring tool carriage assembly 27. These parts are suitably supported on a base structure 28 and a machine frame 29. The apparatus also includes transverse frame members 30 for supporting various parts thereof.

Reactor Holder

Referring specifically to FIGURES 1, 2, 4, 5, 5a and 8, the particular reactor holder and tilting mechanism 25 illustrated comprises a pair of cradle members 35 integrally secured together in right angular relationship and having an arcuate inner contour with rests or centering ribs 34 forming a seat for the rounded bottom portion 21 of the reactor. At the open end of the cradle is an annular frame member 37 having a drive trunnion 38 and an idler trunnion 39 journaled in bearings 40 mounted on a pair of stationary supports 42.

The holder is free to rotate through a partial revolution relative to the stationary supports 42 for tilting a reactor between a vertical loading position, FIGURE 5, and a horizontal boring position, FIGURES 2 and 8. Drive trunnion 38 has a large gear wheel 44 thereon and this gear wheel is in mesh with a pinion 45, FIGURE 5, on a shaft 46, these gears being covered by a gear guard 47. Shaft 46 is driven by a reversible motor 50 operatively connected thereto through a gear reducer assembly 51. Motor 50 is equipped with suitable electrically operated brake means 52 for stopping the rotation of the motor and the cradle at predetermined stations.

Referring specifically to FIGURE 4, gear wheel 44 is equipped with a pair of dogs 55 and 56 engageable, respectively, with limit switches 57 and 58 in the limit positions of the holder, these switches having actuating arms 59 disposed in the path of the dogs. Switch 57 stops the motor and sets the motor brake 52 when the holder reaches horizontal position just as the reactor touches the stationary rest 26 in its downward movement into a position for engagement by the boring tool. Switch 58 stops the motor 50 and sets its brake when the cradle reaches its upright loading position, as shown in FIGURE 4. Movement of the holder from one position to another is initiated by manual starting switches, not shown. Control circuits, including manual switches for energizing the motor 50 for rotation in either direction and including limit switches 57 and 58 for automatically deenergizing the motor and setting its brake, are not shown as these are conventional in machinery control and are well understood in the art. Operation of the holder for the reactor, as well as other operating mechanisms to be described, are controlled from a tilt control panel adjacent the tilt mechanism 25.

The annular frame member 37 at the open end of the holder has mounted therein a plurality of clamp assemblies comprising power-operated clamps 62 and hand-operated clamps 63. Although any number of these clamps may be provided in the annular frame member 37, there is illustrated herein three power-operated clamps and three hand-operated clamps, and in their arrangement on the member 37, as shown in FIGURE 5a, a hand clamp is disposed diametrically opposite from each power-operated clamp so that a fine hand adjustment can be utilized, if necessary, to position the closed end of the reactor in a precise position wherein the reactor is in axial alignment with the boring tool. This adjustment is provided to adapt the apparatus to reactors having different diametrical dimensions. The hand clamps 63 are used as pre-set fixed location clamps for automatic centering of the reactor when clamps 62 are operated. The hand clamps are on the lower side of annular frame or ring 37 to support the reactor in its horizontal position, the power-operated clamps then being on the upper side of the reactor.

FIGURE 6 is a detail view of one of the power-operated clamps 62 comprising a cylinder 65 having a piston-operated rod 67 secured to a slide 68 slidable in a sleeve 69. Slide 68 has a rubber nose or gripping pad 70 which engages the reactor 20 and has an arm 72 on which is mounted a pointer 73 cooperating with a depth gauge 74 for indicating the position of the clamp when it is clamped against the reactor. Cylinder 65 is connected with a suitable source of fluid pressure, not shown.

The hand clamps 63 are of substantially similar structure, utilizing a shaft 67', a slide 68 thereon slidable in a sleeve 69, a rubber nose or gripping pad 70, and an arm 72 and pointer 73 cooperating with a depth gauge 74. Shaft 67' has a hand wheel 76 and is threadedly mounted in a head 77 for accomplishing the desired adjustment.

Supported on the machine frame 29 is a transverse frame 80, FIGURE 9, of rigid box beam construction, having a curved upper surface 81 on which is mounted a plurality of hand clamps 82 having the same structure as the hand clamps 63. Clamps 82 are disposed in side-by-side relationship, FIGURE 9, and are radial to the reactor 20 to form a rounded bottom side support for the reactor adjacent the open end of the reactor, the overall radius of curvature of the support furnished by these clamps conforming substantially to the radius of curvature of a reactor.

Pivotally mounted on the frame member 80 by pins 83 are a pair of clamp arms 84 having shoes 85 with curved resilient pads for engaging the wall of the reactor. Arms 84 are operated by a toggle mechanism comprising a pair of links 86 and 87 pivotally connected together by a pin 88. Links 87 are pivotally connected to arms 84 by pins 79. Links 86 and 87 break downwardly and have lower projections 89 and 90, respectively, which are adapted to abut and limit the upward closing movement of the toggle. The toggle mechanisms are each actuated by a fluid-operated cylinder 92 pivotally mounted at 93 and having a piston rod 94 pivotally connected to the pivot pin 88. A hand clamp unit 95 is mounted on each side of the frame 80 and each link 86 is pivotally connected at 96 to a slide member 97 in the clamps which has axial movement with a shaft 98 threadedly mounted in a clamp head 99. Shaft 98 has a hand wheel 100, and the clamp assembly, which is similar to the clamps 63 on the reactor holder, have a traveling pointer 102 which cooperates with a stationary gauge 103 for setting the shaft 98 and, consequently, the pivot point at 96 in a desired position.

The clamping action of the arms 84 is accomplished by the actuation of fluid-operated cylinders 92, and, as seen in FIGURE 9, the toggle mechanism on the right side thereof is shown in broken position for pulling the arm 84 out of engagement with the reactor, and the toggle on the left side is shown in closed position for holding the arm 84 in engagement with the reactor. The arms 84 operate in unison and are shown in FIGURE 9 in different positions merely for illustrating the movement thereof. In fully retracted position the arms are sufficiently spaced apart so that the reactor can move freely upwardly or downwardly between the shoes 85. Prior to clamping the arms in engagement with the reactor, the proper transverse spacing adjustment is accomplished by the clamps 95. Depth gauges 103 are utilized for reference in setting or resetting the clamp slide members in different spaced relation.

To mount a reactor in the present structure, the reactor holder is rotated so that the cradle members 35 are disposed in a downwardly hanging position relative to the frame member 37, as shown in FIGURE 5. Clamps 62 are retracted and the reactor is then lowered into engagement with the cradle members. Clamps 62 are then tightened on the reactor and the holder is rotated to bring the reactor into engagement with the rest clamps 82 on the transverse frame 80. Any necessary adjustment to center the reactor properly with the boring tool is readily accomplished by operation of the clamps 63, 82 and 95.

The pads on shoes 85 do not have a vertical centering action but readily accommodate themselves to the reactor surface in the vertical adjustment determined by the rest clamps 82. The clamping action of arms 84 tends to raise the center of the beam under rest clamps 82 and box beam 80 is sufficiently rigid to resist deformation under the clamping stresses without reaction on the frame members supporting this structure. Thus, the transverse frame 80 merely rests on the longitudinal frame members of the machine without distorting them when the rest clamps are tightened.

Boring Tool Carriage

The particular boring tool carriage assembly 27 illustrated comprises a carriage 105, FIGURES 1, 2 and 3, equipped with rollers 106 engageable with longitudinally disposed tracks or ways 107 mounted on transverse frame members 30. Tracks 107 are connected to supports 42 by tension links 109, as seen in FIGURE 4. Secured on the inner face of each of the tracks 107 is an elongated rack 108. Mounted on the carriage 105 is a cantilever bearing support 112 in which is journaled a tubular output shaft 113 having an externally flanged end portion 114. The output shaft 113 is adapted to hold and rotate an elongated boring tool 116 in a horizontal projecting position above the tracks 107. The boring tool 116 has a cutter head 120 adapted to operate either in a cutting step or a scraping step, to be described hereinafter.

Referring particularly to FIGURE 1, rotative operation of the cutting tool 116 and longitudinal traveling movement of the carriage 105 are accomplished by three motors 122, 123 and 124. Motor 122 is connected to a speed change gear box or transmission 125 by means of a shaft 126, and this gear box has an output shaft 128 which drives a bull gear reducer mechanism 129 for a bull gear 127 on boring shaft 113. Shaft 128 also drives a feed change gear box or transmission 130 which has an output shaft 131 connected to another shaft 132 through a gear casing 133 housing suitable gears. Shaft 132 is connected to a clutch 135 having an output shaft 136 gear-connected to a pair of downwardly projecting shafts 137, also shown in FIGURE 2, through gear assemblies 138. Shafts 137 have feed drive pinions 140 which mesh with the racks 108 on the tracks 107. Hold-down lugs 109 are disposed on the bottom of the carriage at each side and are adapted to travel with slight clearance under the lower face of track 107 to prevent the carriage from lifting on one side if a heavy torque load on the boring tool is encountered.

The motor 122 and parts associated therewith, so far described, are utilized to advance the carriage in a boring operation and simultaneously rotate the boring tool. The advancing speed of the carriage during a boring operation may be varied as desired by changing the gear ratio in the gear box 130, and the revolutions per minute of the boring tool may also be varied according to the hardness of material and other factors by changing the gear ratio in the speed change gear box 125. The advancing movement of the carriage is caused by rotation of the feed drive pinions 140 on the racks 108, and, in this advance movement, the clutch 135 is engaged to establish connection between the shafts 132 and 136.

Motor 123 is arranged for driving the carriage at a faster speed and is reversible for moving the carriage in one direction up to a boring position or withdrawing the carriage in the opposite direction after a boring operation. To accomplish these functions, the motor 123 drives a shaft 145 connected to another shaft 146 through a gear casing 147 housing suitable gears. Shaft 146 is adapted to be connected to a shaft 149 through a clutch mechanism 150. Motor 124 is arranged for driving the carriage 105 during a scraping operation of the boring tool. Motor 124 drives a shaft 152 connected to a shaft 153 through a clutch mechanism 154, and shaft 153 is connected to the shaft 146 through the gear casing 147 for driving the vertical shafts 137. As there is a positive connection of shafts 145 and 153 in the gear casing 147, it will be seen that when motor 124 is energized, motor 123 will be driven therewith, but, as motor 124 drives the carriage at a slow speed, no deleterious effects will result from the idling rotation of motor 123. However, when motor 123 is energized, the clutch 154 is disengaged so that motor 124 will remain idle.

Boring Tool

The particular boring tool 116 illustrated, which may be referred to as a boring bar, comprises an elongated tube having an external spiral fin 158 which serves as a conveyor screw to provide continuous and positive feeding of the cut particles away from the cut and out of the reactor opening as the boring tool progresses into the reactor. Boring tool 116 has an externally flanged end 159 and is fabricated in tubular form from steel plate to have maximum torsional and bending stiffness.

The cutter head 120 is fabricated in hemispherical shape and is shown in detail in FIGURES 11–15. The cutter head has an internal annular rear flange 161 provided with a plurality of tapped holes 162. As seen in FIGURE 8, boring tool 116 is provided with an internal flange 164 on the end opposite from the external flange 159, and this flange has a plurality of apertures 165 arranged in number and location to align with the tapped holes 162 in the flange 161 of the cutter head. The cutter head is removably held on the boring tool by studs 166 threaded in bores 162. The external flanges 114 and 159 are similarly secured together to mount the boring tool on hollow shaft 113.

The cutter head 120 has a hemispherical shell plate 169 and a plurality of curved overlying bars 170 with inclined circular bores 171, each having an intersecting tapped bore 172 for receiving a setscrew 173. Mounted in the bores 171 are square tooth bits 175 in square-holed cylindrical holders 174. Each tooth bit has a notched step 176 and a beveled end 177 forming a sharp cutting edge 178. The tooth bits are securely mounted in the holders 174 by the setscrews 173 bearing against the notched steps 176 and the holders are welded to the bars 170, as shown in FIGURE 13. Small abutment or wedge blocks 179 are welded on the head under the bits 175.

Thus, the bits cannot fall out if the setscrews work loose and the boring stresses are not transmitted to the setscrews. The cutting edges 178 are oriented transversely of their direction of circular travel, the square shape of the bits preventing rotation in their holders.

As seen in FIGURE 11, the cutter bars 170 are spirally shaped and converge at a central head block 185 having a plurality of bits 175 similarly secured in holders 174, the same as shown in FIGURE 13. All the bits 175 are arranged in staggered relation so as to travel in overlapping circular paths and provide scarifying action over the whole hemispherical surface of the material which is acted upon. No two of the bits travel in exactly the same path. The beveled ends of all the bits have a small relief angle as shown in FIGURE 13 and the bit shanks are forwardly inclined approximately 30° from a direction perpendicular to the surface acted upon.

The arrangement of the cutting bits on the rounded cutting head produce cuts in all radial directions within a hemispherical envelope symmetrically disposed about the center of rotation to provide means for securing a radially balanced boring head loading with no unbalanced side loading on the boring bar. This balanced loading also provides automatic centering action to cancel all tendency to depart from a true axially aligned direction. The staggered relation of the bits 178 and their relatively small size limit the size of the product particles within a predetermined range. If a large block of the solidified material should break loose from the main mass during the boring operation, such block will be held in place ahead of the bits and be reduced to the proper particle size without interruption of the boring operation. Shell 169 prevents large broken blocks from falling through between the bars 170. The angular relationship of the bits to the product surface and the angular disposition of the beveled surface 177 on the bits provides maximum efficiency in fracturing particles from the solid mass with minimum production of fines or dust and with a minimum of abrading action on the bits to produce an optimum tool life.

The bits are mounted in different positions on each bar 170 so spaced that all bits have the same work load and remove equal volumes of material in each revolution even though the lengths of the different travelled paths vary widely from the center to the circumference of the cut surface. Hence, all the bits experience approximately equal wear in a given working time and some bits are not worn out faster than others.

The bars 170 are shown herein as assuming a right-hand helix, but could as well assume a left-hand helix with the boring tool having the opposite direction of rotation than that shown. Thus, the bars 170 themselves act as spiral conveyors for passing the cut material back to the fin 158 for removal.

Scrapers

During the high temperature reaction phase of the metallic reduction, certain volatile substances are produced in the reactor. These gases condense on cooling, and leave a crusty deposit on the upper inside walls of the reactor. In general, these gases are in the nature of a contaminate, and such deposit must be removed before the metal-bearing solidified mass can be processed or bored from the reactor. To accomplish a thorough cleaning action, the head 120 preferably is equipped with suitable scraping means, such as shown in FIGURES 16–19. Thus, mounted across the interior of the head in aligned relationship and projecting on opposite sides of the head are a pair of tubular casings 202 secured to the head frame and supported at their inner ends by an inwardly projecting support 203, the casings 202 being beveled at 204 at their outer ends. For this structure see also FIGURE 12.

Mounted in each of the casings 202 is a sleeve 205, and, as best seen in FIGURE 18, each casing has an end slot 190 which slidably accommodates a key 206 mounted in a notch 191 in the sleeve 205 by means of cap screws 192. Key 206 is engageable with the side walls of the slot 190 to prevent relative rotation between the casing and its sleeve, and a lock spring 207, having one end attached to the casing, is engageable with one of the cap screws 192 detachably to hold the sleeve in the casing, the key 206 being slidable in the slot 190 in the attachment and detachment of the scraper mechanism.

The inner end of the sleeve is internally threaded and receives a threaded spring retainer plug 208. Slidably mounted in the sleeve is a push rod 210 having a tubular end portion 211 housing a compression spring 213 compressed between the inner end wall of tubular portion 211 and the plug 208, the sleeve 205 and push rod 210 having shoulder portions 214 and 215, respectively, which are adapted to abut for limiting the outward movement of the push rod 210. Sealing means 216 of the resilient O-ring type serves to maintain a sealed relationship between the sleeve and the push rod.

The outer end of the push rod 210 is rounded at 218, and mounted adjacent the rounded end by a pin 221 is a clevis 219. An arm 225 has a slot 226 adjacent one end which slidably confines a bolt 227 mounted in the clevis 219. Slidable movement of bolt 227 in slot 226 permits automatic adjustable movement of the arm relative to the clevis 219 in a direction substantially parallel to the wall being scraped.

One end of the arm 225 carries a scraping blade or bit 230, and the other end is pivotally mounted by a pin 231 in an anchor post 232 mounted on a plate 233 secured to the cutter head. Pin 231 is removably held in place by a setscrew 235 threadedly mounted in the anchor post 232, and, to remove the scraping attachment from the cutting head, it is necessary merely to pull pin 231 from anchor post 232, whereupon arm 225 will be free of the anchor post 232 and the sleeve 205, together with connected parts, can be disengaged from the casing 202. A connecting chain 236 is attached between a lug 237 on the pin 231 and a lug 238 on the arm 225 to prevent accidental displacement of the pin when the scraping attachment is disengaged from the cutting head.

Sleeve 205 is adapted to receive a filler plug 240, FIGURE 19, in place of the scraping mechanism, this plug having a cap screw 241 therein engageable by the spring 207 for holding the plug in place. When the machine is operating in a boring step, the scraper mechanism is removed and the filler plug 240 is inserted.

As the arm 225 can pivot on the bolt 227 and pin 231, the bit 230 is capable of being urged into constant engagement with the layer of material to be removed by the biasing action of spring 213. In addition, the slidable relationship between head 219 and the arm 225, accomplished by the interaction between the slot 226 and bolt 227, permits slidable adjustment between the arm and head in a direction substantially parallel to the line of cut when the push rod 210 moves axially relative to the sleeve 205. A "Teflon" type plastic abutment or bearing plate 242 is mounted on the arm 225 for engagement by the rounded head portion 218 of the push rod 219.

Referring to FIGURES 1, 2 and 10, a hopper mechanism 243 is arranged to cooperate with the open end of the reactor for receiving the product particles and directing them away from the machine. The particular hopper 243 illustrated has a tapered mouth portion 244, FIGURE 2, adapted to engage the open end of the reactor, and a chute portion 245 receives the particles from the mouth 244 to direct the particles into containers or transporting means. The hopper has a suction chamber 246 around its periphery and this suction chamber has apertures 247 in its inner wall. A pair of suction tubes 248 communicate with the chamber 246 and have horizontal portions telescopically mounted in pipes 249 communicating with suitable vacuum means. The purpose of the chamber 246 is to carry off dust which may arise from the boring operation.

The hopper is mounted on rollers 250 engageable with tracks 251 mounted longitudinally of the machine on the transverse frame members 30 and can be rolled into or out of engagement with the mouth of the reactor when desired, the telescopic connection between tubes 248 and pipes 249 permitting such movement of the hopper without disconnecting the suction system. The boring tool projects through the mouth of the hopper in a boring or scraping operation. The face of the upper mouth 244 is fitted with a circumferential flexible rubber seal ring means for making the connection between the hopper and the reactor dust-tight.

Operation

Preparatory to performing a boring operation, the clamp arms 84 of the clamp assembly 26 are retracted to open position by suitable actuation of the fluid-operated cylinders 92, and the cradle members 35 are rotated by means of motor 50 to a vertical position, FIGURE 5, to receive a reactor 20. The cradle is held in the vertical position just described by means of the motor holding brakes 52, and, while in this position, the reactor is set therein by overhead crane means. The reactor is clamped in the cradle members by the clamps 62 and 63.

The cradle is then rotated approximately ninety degrees so that the open end of the reactor engages the clamps 82 in the rest assembly 26. The motor 50 is deenergized when the reactor reaches its rest position by means of the limit switch 57 actuated by the dog 55 on the gear wheel 44. Proper adjustment of the reactor may be accomplished by means of clamps 62, 63 and 82 to align it axially with the boring tool. When this has been accomplished, cylinders 92 are actuated to move clamp arms 84 together, bringing the shoes 85 into firm engagement with opposite sides of the reactor. If the diameter of the reactor is of different dimension than the previous reactor, clamps 95 will need adjusting prior to the closing of clamp arms 84. When the reactor is firmly clamped in place, axial movement toward its closed end is prevented by the cradle members 35, and radial and rotary movement is prevented by the clamp members.

The hopper mechanism 244 is then moved axially until it is in firm contact with the end of the reactor 20. Filler plugs 240 are removed from the boring head and the scrapers are attached.

With the reactor firmly clamped and the hopper in position, the motor 123 is then energized for rapidly advancing the carriage toward the reactor without rotation of the boring tool, the clutch 150 being engaged and the clutches 135 and 154 being disengaged. When the scraper blades have entered into the reactor, the motor 123 is deenergized and motor 122 is energized for rotating the boring tool, with the clutch 135 still disengaged. Then, motor 124 is energized with the clutches 150 and 154 engaged for advancing the carriage at a predetermined rate of speed. Motor 123 will be driven idly during the scraping operation at a relatively slow speed which will not introduce an objectionable drag.

Upon completion of the scraping of the side wall, as the boring head reaches the main mass of material in the reactor, the motors 124 and 122 are deenergized, clutch 154 is disengaged, and the motor 123 energized in its reverse direction for rapidly withdrawing the carriage. The scraper arms are removed, plugs 240 inserted, and the tool is ready for its boring operation.

Then the carriage is again advanced in rapid traverse by motor 123, as above described, with clutch 150 engaged and clutches 135 and 154 disengaged. When the boring tool 116 reaches the face of the solidified mass, motor 123 is deenergized, clutch 150 is disengaged, the motor 122 is energized, and clutch 135 engaged, to rotate the boring tool and to advance the carriage slowly in a feed movement. As the tool advances into the material, the teeth 175 on the cutter head cut or chip off small pieces or particles of the material in concentric overlapping circular grooves, and the spiral fin 158 conveys the material rearwardly to the opening of the reactor. The material falls by gravity into the hopper 243.

When the boring tool has completed the removal of the useful material from the reactor, the motor 122 is deenergized, clutch 135 is disengaged, clutch 150 is engaged, and the motor 123 reversed and energized for withdrawing rapidly the boring tool from the reactor. The steady rest clamps 84 are unlocked and the reactor is tilted back to vertical position for removal from its holder.

Rotational speed of the boring tool and the feed and retract movements of the carriage are adjustable by means of the gear boxes 125 and 130. Although the invention is not to be limited to specific operational speeds of the carriage and the boring tool, in a particular application thereof for removing a titanium salt compound from a reactor, it has been found to be preferable to utilize a carriage speed in the range of from five-eighths inch to two and one-half inches per minute for the boring operation by motor 122, a carriage speed of ten feet per minute for rapid advance and retract by motor 123, a carriage speed of one foot per minute for the scraping feed by motor 124, and a boring tool rotational speed of from four r.p.m. to ten r.p.m. by motor 122.

Cutter Head Modification in FIGURES 20–31

The cutter head 300 shown in FIGURE 20 comprises a hemispherical shell 301 having a plurality of spiral cutter rib castings 302 equipped with cutting bits, mounted on its outer surface in the same general arrangement shown in FIGURE 11, the ribs being shown in outline and the bits being omitted in FIGURE 20. The bits are mounted in staggered relation on all the ribs so that they cut in overlapping circles, as previously described. The central head block 303 at the junction point of the ribs, which is on the axis of the boring head, is also equipped with cutting bits, as shown in FIGURE 11, to cut in small overlapping circles. In the aggregate the bits on all the ribs generate a continuous surface of revolution in each rotation of the cutter head which is approximately a hemisphere, all the bits doing equal amounts of work in each rotation as previously described.

A plurality of access openings are provided in the hemispherical shell which are normally closed by cover plates 304. A lifting lug 305 enables the cutter head to be handled by a crane. The boring head is further equipped with a pair of removable scraper assemblies 306 for use in scraping the upper walls of the container 20 in FIGURE 8 before a boring operation. In FIGURES 20–30, the arrow 307 designates the direction of rotation for both boring and scraping.

FIGURES 22–24 illustrate a modified mounting arrangement for the cutter bits 310. Each bit, which is square in cross section, is mounted in a square hole in a circular bit holder sleeve 311 contained in a circular hole 312 in the rib 302. The sleeves are welded to the rib at 313. Before welding, the sleeves are rotated to the proper orientation in holes 312 so that the cutting edge of each bit is directed transversely of its direction of travel when the cutter head rotates. It will be appreciated that in order to achieve this result each bit will be positioned in a slightly different angular relation to its rib 302, this relation, after careful adjustment, being fixed by weld 313 so that the adjustment is not disturbed by removing and replacing the bits.

Adjusting screws 314 hold the bits in proper longitudinal position in sleeves 311. The screws 314 are threaded through rib backing strips 315 in axial alignment with the bores 312, the screws 314 being small enough to enter the square holes in sleeves 311 to extend the bits as may be necessary on account of wear. The bits are retained in the sleeves by setscrews 316 in threaded holes on the trailing sides of ribs 302, these holes extending through the sleeves. Ribs 302 and backing strips 315 are secured on the outer and inner surfaces, respectively, of shell 301 by welds 317.

As shown in FIGURES 25 and 28, fin 158 on boring tube 116 is cut circumferentially adjacent the end of each rib 302 and bent into alignment therewith as indicated at 158a to feed cut material from the ribs back to the main part of the fin. The end of each such bent fin portion is attached to the rib by screws 318. It will be noted that in this modification the boring tube 116 is smaller than the cutter head and is equipped with an external flange 164a which is secured by screws 166 to the internal flange 161a of the cutter head.

Referring now to FIGURE 29, the removable scraper assembly 306 comprises a scraper blade 320, a scraper drag arm 321, a push socket 322 and a stiff link 323. Scraper arm 321 extends circumferentially in the direction of rotation of the boring head and its leading end is bifurcated and apertured at 324 for pin connection with a hole 325 in a scraper arm anchor bracket 326 on shell 301. See FIGURES 20, 21, 22, 25 and 30. A removable pin 327 provides for detachment at this point.

Stiff link 323 extends generally rearwardly in a direction parallel with the axis of rotation of the boring head and is similarly bifurcated and equipped with holes at its rear end 328 to receive a removable pin 329 engageable in hole 331 in bracket 330 on the shell 301. The axially forward end of stiff link 323 is similarly bifurcated and connected by a pin 332 with a lug 333 on scraper arm 321. Pins 327 and 329 are secured by spring detents (not shown) so that they may be readily withdrawn from bracket holes 325 and 331 for installing and removing the scraper assemblies. Pin 332 is radial to the axis of pin 327 and pin 329 is parallel with pin 332. Lug 333 is perpendicular to pin 332 and bracket 330 is parallel with lug 333 when the scraper arm is in working position. The pin connections accommodate a slight change in the angular position of lug 333 when the scraper arm is extended and retracted.

Push socket 322 has a bayonet slot 335 on its inner end for detachable connection with a transverse pin 336 in the outer end of a piston rod 340. The outer end of push socket 322 is equipped with a rounded bearing pad 341 to bear against a flat bearing pad on scraper arm 321 as shown in FIGURES 30 and 31. A clevis 342 is connected by pin 343 with push socket 322. The bifurcated end of clevis 342 is equipped with a pin 344 extending through a slot 345 in scraper arm 321. Slot 345 is considerably wider than the diameter of pin 344 whereby the pin may travel transversely as well as longitudinally in the slot so that the thrust of piston rod 340 is applied to the scraper arm through the bearing pad 341 without imposing a load on the pin 344. As shown in FIGURE 31, scraper arm 321 is narrower than the space between the arms of clevis 342 to allow the scraper arm to move lengthwise of pin 344 as it follows the arcuate movement of stiff link 323.

Push socket 322 slides in a guide tube 346 which is radial to the axis of the cutter head but not radial to hemispherical shell 301 since this guide tube is in the same position as guide tube 202 in FIGURE 12. Guide tube 346 is part of a tubular cylinder assembly 350 which is mounted at its outer end in a short tubular support 351 projecting obliquely from the shell 301 and at its inner end in tubular support 203.

The inner end of piston rod 340 is connected with a piston 352 slidable in a fluid pressure cylinder 353. The piston is normally retracted by a compression spring 354 which is confined between the piston and a stationary abutment 355 in the cylinder. Inward movement of the piston is limited by a stop ring 356 and outward movement is limited by a stop tube 357. Fluid pressure is admitted to the inner end of the cylinder through a port 358 communicating with fluid pressure line 360. Fluid pressure line 360 extends out the rear end of the boring tube and has a swivel connection on the axis thereof with a fluid pressure supply pipe.

FIGURES 30 and 31 show the scraper retracted by spring 354. When fluid pressure is introduced into cylinder 353, scraper blade 320 is projected into engagement with the inner surface of reactor 20 whereby rotation of the cutter head removes the contaminating encrustation 370 on the upper wall in preparation for boring out the metal-bearing mass in the lower part of the reactor. The two scrapers shown in FIGURE 20 are diametrically opposite each other to provide balanced loading on the cutter head during the scraping operation. The scraping and boring operations are carried out as described in connection with the first embodiment. When the scraper assemblies are removed for boring, the outer ends of tubes 350 are plugged as in FIGURE 19.

The present invention thus provides an efficient apparatus for removing a hard metal or a hard metal-containing material from a reactor pot. The invention may take other forms, and, although it is described as used in conjunction with the process of making titanium, the boring machine will, obviously, be capable of other applications in which material is to be broken up and then removed from a container or mass. The invention also is not to be limited to the horizontal positioning of the reactor because it is obvious that the reactor could as well be anchored in a tilted position relating to the horizontal, it being necessary only that the boring tool have axially aligned movement relative to the reactor.

Having now described my invention and in what manner the same may be used, what I claim as new and desire to protect by Letters Patent is:

1. In a boring tool adapted for rotation in one direction for removing solidified material from a container, a cutter head having a convex shell, a plurality of spiral bars on said shell extending from the center in a trailing direction to the periphery thereof to discharge cuttings from said periphery, circular bores in said bars, polygonal-holed cylindrical sleeves welded in said bores, polygonal shank bits in said sleeves, and setscrews securing said bits in said sleeves, said sleeves being so turned in said bores as to orient the cutting edges of said bits transversely of their directions of circular travel.

2. In a boring tool, a cutter head having a hemispherical shell, a plurality of spiral bars on said shell extending from the center to the periphery thereof, circular bores in said bars, square holed cylndrical sleeves secured in said bores, square cutting bits in said sleeves, adjusting screws inside said shell aligned with said bores and adapted to engage the inner ends of said bits, and setscrews in said bars engageable with the sides of said bits.

3. In a boring tool, a cutter head having a hemispherical shell, a plurality of spiral bars on the outside surface of said shell extending from the center to the periphery thereof, circular bores in said bars, square holed cylindrical sleeves secured in said bores, square bits in said sleeves, backing strips on the inside surface of said shell underlying said ribs, adjusting screws in said backing strips aligned with said bores and adapted to engage the inner ends of said bits, and setscrews in said ribs engaging the sides of said bits.

4. An apparatus for removing a solidified material from a cylindrical container comprising a holder arranged to support a container, a carriage movable parallel with a container in said holder, a rotatable boring tool on said carriage coaxial with said container when supported by said holder, a cutter head on said boring tool having a curved face portion, cutting bits on said face portion, a push rod slidably mounted in said cutter head and projecting through said face portion, detachable scraping means pivotally mounted on said head for engagement by said push rod, and means for applying outward thrust to said push rod for urging said scraping means outwardly beyond the cutting paths of said bits.

5. An apparatus for removing a solidified material from a cylindrical container comprising a holder arranged to support a container, a carriage movable parallel with a container in said holder, a rotatable boring tool on said carriage coaxial with said container when supported by said holder, a cutter head on said boring tool having a curved face portion, a push rod slidably mounted in said cutter head and projecting through said face portion, an arm member pivotally and detachably mounted at one of its ends to said head and at its other end to a projecting portion of said push rod, scraper bit means on said arm, and means for applying outward thrust to said push rod.

6. An apparatus for removing a solidified material from a cylindrical container comprising a holder arranged to support a container, a carriage movable parallel with a container in said holder, a rotatable boring tool on said carriage coaxial with said container when supported by said holder, a cutter head on said boring tool, a pair of scraper arms pivotally and detachably mounted on opposite sides of said cutter head and extending circumferentially in a trailing direction relative to the direction of rotation, scraper blades on the trailing ends of said arms, radial push rods in said cutter head detachably connected with the trailing ends of said arms, and means for applying outward thrust to said push rods for extending said scraper blades.

7. An apparatus for removing a solidified material from a cylindrical container comprising a holder arranged to support a container, a carriage movable parallel with a container in said holder, a rotatable boring tool on said carriage coaxial with said container when supported by said holder, a cutter head on said boring tool, a pair of scraper arms pivotally and detachably mounted on opposite sides of said cutter head and extending circumferentially in a trailing direction relation to the direction of rotation of the cutter head, scraper blades on the trailing ends of said arms, radial push rods in said cutter head detachably connected with the trailing ends of said arms, means for applying outward thrust to said push rods for extending said scraper blades, and a pair of stiff links extending generally longitudinally of the boring tool for stabilizing said scraper arms, said stiff links having forward ends pivotally connected with the trailing ends of said scraper arms and rear ends pivotally and detachably connected with said cutter head.

8. In a boring machine for removing solidified material from a cylindrical container a tubular drive shaft rotatable in one direction and having a flanged end, a cantilever torque tube having a flange on one end secured to said shaft flange, said torque tube being entirely supported by said drive shaft, a spiral conveyor fin on said torque tube, a flange on the outer end of said torque tube, a cutter head having a convex shell connected at its periphery to said outer end flange on said torque tube, a plurality of spiral bars on said shell extending from the center in a trailing direction to the periphery thereof to discharge cuttings from said periphery to said conveyor fin, the peripheral ends of said bars being rotatable in a circle of approximately the same diameter as said fin, cutting bits mounted in said bars, and means to advance said torque tube and cutter head in the direction of said cutter head.

9. In a boring machine, a rotatable torque tube having a spiral fin thereon, a cutter head having a hemispherical shell connected at its periphery to one end of said torque tube, a plurality of spiral bars on said shell extending from the center to the periphery thereof, the peripheral ends of said bars being rotatable in a circle of approximately the same diameter as said fin, cutting bits mounted in said bars, a pair of scraper arms pivotally and detachably mounted on opposite sides of said shell, push rods in said shell detachably connected with said arms in spaces between said bars, and means for applying outward thrust to said push rods to extend said scraper arms.

10. An apparatus for removing a solidified material from a cylindrical container comprising a holder arranged to support a container in tilted position, a carriage movable parallel with a container in said holder, a boring tool on said carriage, said boring tool comprising a rotatable torque tube coaxial with said container when supported by said holder and having a spiral fin thereon, a cutter head having a hemispherical shell connected at its periphery to one end of said torque tube, a plurality of spiral bars on said shell extending from the center to the periphery thereof, cutting bits mounted in said bars, a plurality of push rods in said shell, means for applying outward thrust to said push rods, and detachable scraper blades extendable from said shell by said push rods.

11. An apparatus for removing a solidified material from a cylindrical container comprising a holder arranged to support a container in tilted position, a carriage movable parallel with a container in said holder, a boring tool on said carriage, said boring tool comprising a rotatable torque tube coaxial with said container when supported by said holder and having a spiral fin thereon, a cutter head having a hemispherical shell connected at its periphery to one end of said torque tube, a plurality of spiral bars on said shell extending from the center to the periphery thereof, cutting bits mounted in said bars, a plurality of scrapers mounted on detachable pivotal linkages on said shell, and fluid pressure operated means in said shell for extending said scrapers.

12. An apparatus for removing a solidified material from a cylindrical container comprising a holder arranged to support a container in tilted position, a carriage movable parallel with a container in said holder, a boring tool on said carriage, said boring tool comprising a rotatable torque tube coaxial with said container when supported by said holder and having a spiral fin thereon, a cutter head having a hemispherical shell connected at its periphery to one end of said torque tube, a plurality of spiral bars on said shell extending from the center to the periphery thereof, cutting bits mounted in said bars, a plurality of scrapers mounted on detachable pivotal linkages on said shell, fluid pressure operated cylinder and piston units in said shell for extending said scrapers, and springs in said units for retracting said scrapers.

13. In a boring tool, a cantilever torque tube adapted for rotation in one direction, a spiral conveyor fin on said torque tube, a cutter head having a hemispherical shell connected at its periphery to one end of said torque tube, a plurality of spiral bars on said shell extending substantially radially from the center thereof, and then curving in a trailing direction to the periphery thereof to feed cuttings to said conveyor fin, circular bores in said bars, polygonal-holed cylindrical sleeves welded in said bores, polygonal shank bits in said sleeves, and setscrews securing said bits in said sleeves, said sleeves being so turned in said bores as to orient the cutting edges of said bits transversely of their directions of circular travel.

References Cited in the file of this patent

UNITED STATES PATENTS

| 846,196 | Freas | Mar. 5, 1907 |
|---|---|---|
| 998,534 | Knuckles | July 18, 1911 |
| 1,270,092 | Armstrong | June 18, 1918 |
| 1,388,490 | Suman | Aug. 23, 1921 |
| 1,730,399 | Wetmore | Oct. 8, 1929 |
| 1,888,032 | Fischer | Nov. 15, 1932 |
| 2,438,673 | McMahan | Mar. 30, 1948 |
| 2,695,158 | Hawthorne et al. | Nov. 23, 1954 |
| 2,705,128 | McClennan | Mar. 29, 1955 |
| 2,741,462 | Baca | Apr. 10, 1956 |
| 2,743,096 | Smith | Apr. 24, 1956 |
| 2,751,203 | Compton | June 19, 1956 |
| 2,775,439 | McCarthy | Dec. 25, 1956 |
| 2,911,662 | Sedgwick | Nov. 10, 1959 |

FOREIGN PATENTS

| 415,861 | Italy | Nov. 7, 1946 |
|---|---|---|
| 585,709 | Great Britain | Feb. 20, 1947 |
| 162 | Great Britain | of 1868 |